United States Patent
Lee

(10) Patent No.: US 10,121,379 B2
(45) Date of Patent: Nov. 6, 2018

(54) APPARATUS FOR SAFETY-DRIVING OF VEHICLE

(71) Applicant: HYUNDAI MOBIS Co., Ltd., Yongin-si, Gyeonggi-do (KR)

(72) Inventor: Seong Soo Lee, Yongin-si (KR)

(73) Assignee: HYUNDAI MOBIS Co., Ltd., Yongin-si, Gyeonggi-Do (KR)

( * ) Notice: Subject to any disclaimer, the term of this patent is extended or adjusted under 35 U.S.C. 154(b) by 345 days.

(21) Appl. No.: 14/993,663

(22) Filed: Jan. 12, 2016

(65) Prior Publication Data

US 2016/0203720 A1   Jul. 14, 2016

(30) Foreign Application Priority Data

Jan. 13, 2015   (KR) .................. 10-2015-0006393

(51) Int. Cl.
  *G08G 1/16*    (2006.01)
  *B60R 1/00*    (2006.01)
  *G06K 9/00*    (2006.01)
  *H04N 7/18*    (2006.01)

(52) U.S. Cl.
  CPC .............. *G08G 1/167* (2013.01); *B60R 1/00* (2013.01); *G06K 9/00798* (2013.01); *G06K 9/00825* (2013.01); *G08G 1/166* (2013.01); *B60R 2300/607* (2013.01)

(58) Field of Classification Search
  CPC .... G08G 1/167; G08G 1/166; G06K 9/00825; G06K 9/00798; B60R 1/00; B60R 2300/607
  See application file for complete search history.

(56) References Cited

U.S. PATENT DOCUMENTS

| | | | |
|---|---|---|---|
| 6,577,334 B1* | 6/2003 | Kawai | B60G 17/0165 348/148 |
| 9,773,177 B2* | 9/2017 | Takemura | H04N 5/2171 |
| 2005/0134440 A1* | 6/2005 | Breed | B60N 2/2863 340/435 |
| 2006/0015252 A1* | 1/2006 | Yamamoto | G01S 17/936 701/301 |
| 2008/0198226 A1* | 8/2008 | Imamura | G06K 9/00805 348/148 |
| 2010/0066527 A1* | 3/2010 | Liou | B60Q 9/008 340/461 |

(Continued)

*Primary Examiner* — Sathyanaraya V Perungavoor
*Assistant Examiner* — Howard D Brown, Jr.
(74) *Attorney, Agent, or Firm* — Paratus Law Group, PLLC

(57) ABSTRACT

An apparatus for safety-driving of a vehicle, including: a camera unit outputting images of different directions based on a vehicle by photographing the vicinity of the vehicle, the images including a left image and a right image of the vehicle; a top-view image output unit synthesizing the images to output a top-view image; a traffic lane detecting unit detecting a left or right traffic lane of the vehicle from the top-view image by considering a traffic lane feature of the top-view image; a side vehicle detecting unit detecting a wheel of another vehicle in at least one of the left image and the right image; an another vehicle area estimating unit estimating an existing area of another vehicle by considering the location of the detected wheel; and a warning signal output unit outputting a warning signal when the vehicle enters the existing area of another vehicle.

8 Claims, 6 Drawing Sheets

(56) References Cited

U.S. PATENT DOCUMENTS

| | | | | |
|---|---|---|---|---|
| 2010/0188507 A1* | 7/2010 | Kageyama | ......... | G06K 9/00798 |
| | | | | 348/148 |
| 2010/0259617 A1* | 10/2010 | Kawasaki | .......... | G06K 9/00798 |
| | | | | 348/148 |
| 2011/0164789 A1* | 7/2011 | Robert | ............... | G06K 9/00798 |
| | | | | 382/104 |
| 2011/0298602 A1* | 12/2011 | Chen | ...................... | B60Q 9/008 |
| | | | | 340/435 |
| 2012/0062745 A1* | 3/2012 | Han | .................... | B62D 15/029 |
| | | | | 348/148 |
| 2012/0069153 A1* | 3/2012 | Mochizuki | ................ | B60R 1/00 |
| | | | | 348/47 |
| 2013/0177212 A1* | 7/2013 | Wright | ............... | G06K 9/00825 |
| | | | | 382/104 |
| 2014/0192195 A1* | 7/2014 | Su | ......................... | G08G 1/167 |
| | | | | 348/148 |
| 2015/0363668 A1* | 12/2015 | Kato | .................. | G06K 9/00798 |
| | | | | 382/104 |

\* cited by examiner

APPARATUS FOR SAFETY-DRIVING OF VEHICLE

CROSS-REFERENCE TO RELATED APPLICATIONS

The present application claims priority to Korean Patent Application Number 10-2015-0006393 filed Jan. 13, 2015, the entire contents of which application is incorporated herein for all purposes by this reference.

TECHNICAL FIELD

The present invention relates to an apparatus for safety-driving of a vehicle, and more particularly, to an apparatus for safety-driving of a vehicle which outputs a top-view image by synthesizing images acquired by photographing the vicinity of the vehicle, detects and outputs a traffic lane in the top-view image, estimates an existing area of another vehicle by detecting a wheel shape feature of one side image of the vehicle, and announces danger to a driver by outputting a warning signal when the vehicle enters the existing area of another vehicle.

BACKGROUND

As a technology for preventing a collision between vehicles, a technology that monitors a distance between the vehicles by using various pieces of information acquired by using sensors including an ultrasonic sensor, and the like and warns a driver when the distance between the vehicles is smaller than a set distance value is adopted in a lot of vehicles. However, in the case of preventing the collision between the vehicles depending only on the sensor, it is difficult to measure the distance between the vehicles under various driving environments, and as a result, an inaccurate result may be measured.

In recent years, a technology that acquires information on a surrounding situation of a vehicle, which is driven, by various methods other than the sensors and warns the driver when the distance between the vehicles is short based on the acquired information is being researched.

SUMMARY

The present invention has been made in an effort to provide an apparatus for safety-driving of a vehicle which outputs a top-view image by synthesizing images acquired by photographing the vicinity of the vehicle, detects and outputs a traffic lane in the top-view image, estimates an existing area of another vehicle by detecting a wheel shape feature of one side image of the vehicle, and announces danger to a driver by outputting a warning signal when the vehicle enters the existing area of another vehicle.

Objects of the present invention are not limited to the objects described above, and other objects that are not described will be clearly understood by a person skilled in the art from the description below.

An exemplary embodiment of the present invention provides an apparatus for safety-driving of a vehicle, including: a camera unit outputting a plurality of images of different directions based on a vehicle by photographing the vicinity of the vehicle, the plurality of images including a left image and a right image of the vehicle; a top-view image output unit synthesizing the plurality of images to output a top-view image; a traffic lane detecting unit detecting a left or right traffic lane of the vehicle from the top-view image by considering a traffic lane feature of the top-view image; a side vehicle detecting unit detecting a wheel of another vehicle in at least one of the left image and the right image; an another vehicle area estimating unit estimating an existing area of another vehicle by considering the location of the detected wheel; and a warning signal output unit outputting a warning signal when the vehicle is positioned on the detected traffic lane, and the vehicle enters the existing area of another vehicle.

In this case, the traffic lane detecting unit may detect a plurality of traffic lane center points having a predetermined brightness value or more by applying a top-hat filter for each predetermined area in a predetermined direction with respect to a gray-scale image of the top-view image.

The traffic lane detecting unit may detect left and right feature points based on the respective traffic lane center points and the left feature point and the right feature point may correspond to boundaries of predetermined traffic lane brightness patterns.

The traffic lane detecting unit may make a search in all radiation directions based on the left feature point and the right feature point to extract a line component for the left feature point and a line component for the right feature point, and detect a left or right traffic lane of the vehicle based on the traffic lane center point when a difference in angle between the line component for the left feature point and the line component for the right feature point is a threshold or less.

The side vehicle detecting unit may detect the wheel of another vehicle by using at least one of a plurality of Haar-like features in at least one of the left image and the right image.

The side vehicle detecting unit may select at least one of the plurality of Haar-like features by using an Adaboost algorithm and detect the wheel of another vehicle by using the selected Haar-like feature.

When two or more Haar-like features are selected, the side vehicle detecting unit may combine two or more Haar-like features to detect the wheel of another vehicle.

The another vehicle area estimating unit may estimate an area having a predetermined shape and a predetermined size as the existing area of the another vehicle based on the location of the detected wheel.

The warning signal output unit may output the warning signal when a distance between the vehicle and the existing area of the another vehicle is less than a predetermined distance.

The apparatus for safety-driving of a vehicle may further include a warning unit announcing a danger to a driver of the vehicle.

According to an exemplary embodiment of the present invention, an apparatus for safety-driving of a vehicle achieves one or more effects.

First, a wheel shape feature is detected from a surrounding image of a vehicle to recognize another vehicle which may collide with the vehicle.

Second, a wheel shape feature of another vehicle, which is detected by using a Haar-like feature is considered and in addition, an Adaboost algorithm is applied to accurately recognize another vehicle.

Third, an existing area of another vehicle is estimated in a top-view image and when vehicle enters the existing area of another vehicle, the system warns a driver to give an accurate warning such as showing a screen to the driver, or the like. The driver recognizes how the vehicle is close to another vehicle through the screen to significantly contribute to safety driving of the vehicle.

The effects of the present invention are not limited to the effects described above, and a person of ordinary skill in the art will clearly understand other effects that are not described from the description of the scope of the claims.

DETAILED DESCRIPTION

Figure 1:
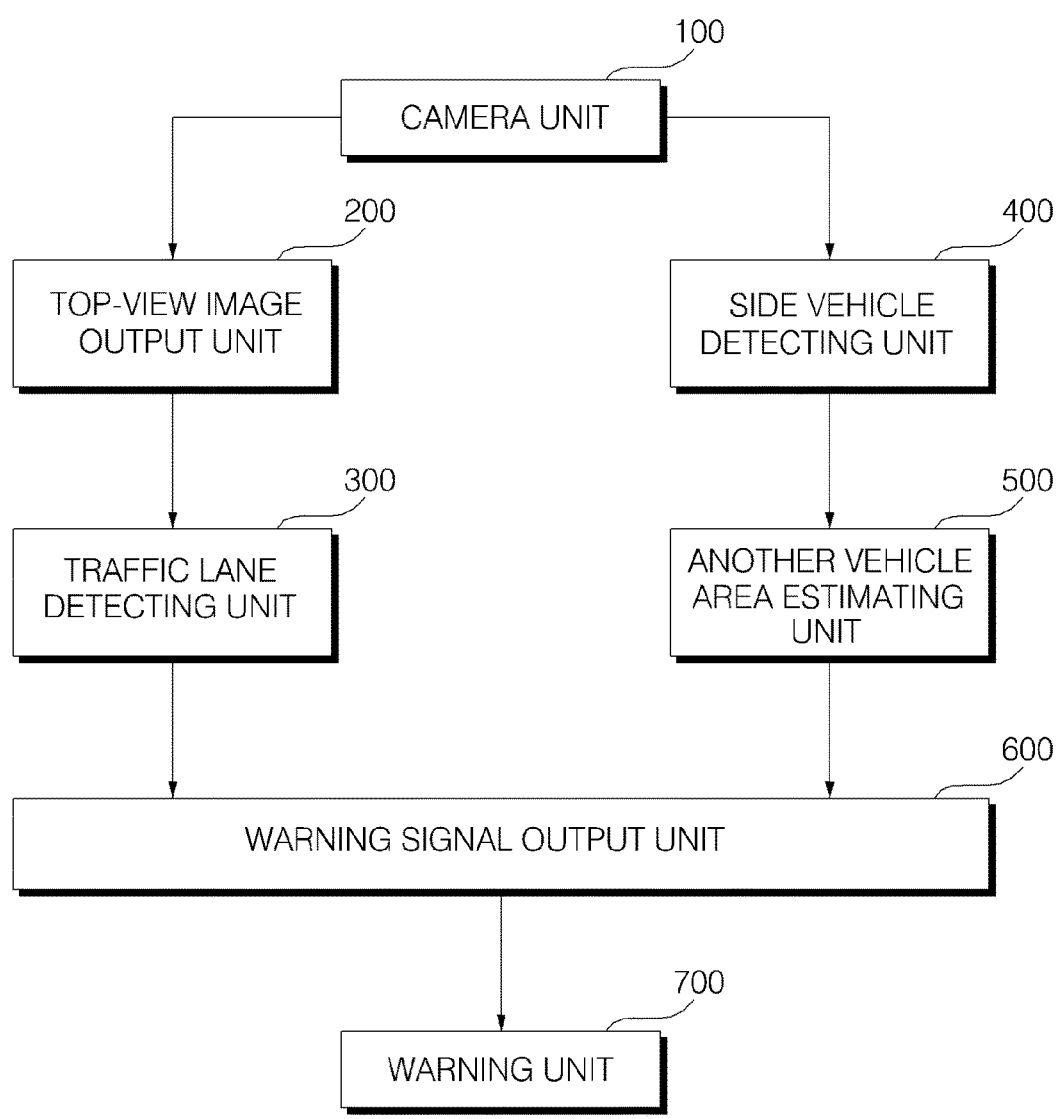
FIG. 1 is a configuration diagram illustrating a configuration of an apparatus for safety-driving of a vehicle according to an exemplary embodiment of the present invention.

The advantages and features of the present invention, and methods of accomplishing these will become obvious with reference to examples to be described below in detail along with the accompanying drawings. However, the present invention is not limited to the exemplary embodiments set forth below, and may be embodied in various other forms. The present exemplary embodiments are for rendering the description of the present invention complete and are set forth to provide a complete understanding of the scope of the invention to a person with ordinary skill in the technical field to which the present invention pertains, and the present invention will only be defined by the scope of the claims. Throughout the whole specification, the same reference numerals denote the same elements.

Hereinafter, the present invention will be described with reference to drawings for describing an apparatus for safety-driving of a vehicle according to exemplary embodiments of the present invention.

FIG. 1 is a configuration diagram illustrating a configuration of an apparatus for safety-driving of a vehicle according to an exemplary embodiment of the present invention. The apparatus for safety-driving of a vehicle according to the exemplary embodiment of the present invention includes a camera unit 100, a top-view image output unit 200, a traffic lane detecting unit 300, a side vehicle detecting unit 400, an another vehicle area estimating unit 500, a warning signal output unit 600, and a warning unit 700.

The camera unit 100 outputs a surrounding image of a vehicle by photographing the vicinity of the vehicle. In detail, the camera unit 100 may include a plurality of cameras disposed at different locations of the vehicle. The respective cameras included in the camera unit 100 are installed at locations to photograph a predetermined direction without interruption in a predetermined field of view. For example, the camera unit 100 may include a first camera disposed at a front bumper of the vehicle, and the like to photograph a front situation, a second camera disposed at a left side mirror of the vehicle, and the like to photograph a left situation, a third camera disposed at a right side mirror of the vehicle, and the like to photograph a right situation, and a fourth camera disposed at a rear bumper of the vehicle, and the like to photograph a rear situation. The camera unit 100 may be operated when the vehicle is driven. The camera unit 100 may be operated by operating a separate switch.

The camera unit 100 outputs an image corresponding to at least a partial field of view of the surrounding of the vehicle to the side vehicle detecting unit 400. For example, the camera unit 100 may output a left image acquired by the second camera and a right image acquired by the third camera to the side vehicle detecting unit 400.

The top-view image output unit 200 synthesizes a plurality of images in different fields of view provided from the camera unit 100 to output a top-view image of the vehicle. The top-view image output unit 200 outputs the top-view image of the surrounding of the vehicle in a direction from the top to the bottom. The top-view image output unit 200 may be an around view monitoring (AVM) system. That is, the top-view image output unit 200 synthesizes surrounding images of the vehicle, which are acquired by the plurality of cameras disposed at different locations of the vehicle, into one image to output the top-view image.

The traffic lane detecting unit 300 detects a traffic lane at one side of the vehicle by considering a traffic lane feature in the top-view image. The traffic lane detecting unit 300 detects a feature corresponding to the traffic lane on at least one of the left side of the vehicle and the right side of the vehicle by using a top-hat filter in the top-view image. For example, the traffic lane detecting unit 300 applies the top-hat filter to a predetermined direction (e.g., a left-to-right direction or a right-to-left direction) in a gray-scale image of the top-view image to detect a plurality of traffic lane center points having a predetermined brightness value or more. In this case, the traffic lane detecting unit 300 may apply the top-hat filter for each predetermined area of the gray-scale image and detect the traffic lane center point for each area.

The traffic lane detecting unit 300 calculates a left feature point LP and a right feature point RP based on each detected traffic lane center point CP. Each left feature point LP and each right feature point RP may correspond to a boundary of a predetermined traffic lane brightness pattern. The process in which the traffic lane detecting unit 300 calculates the feature point by using the top-hat filter will be described below with reference to FIG. 2.

The traffic lane detecting unit 300 makes a search in all radiation directions based on the left feature point LP and the right feature point RP to extract a line component of the top-view image. For example, the traffic lane detecting unit 300 makes a search in 360° based on the left feature point LP and the right feature point RP to extract the line component. The process in which the traffic lane detecting unit 300 extracts the line component from the calculated feature point will be described below with reference to FIG. 3.

Figure 2:
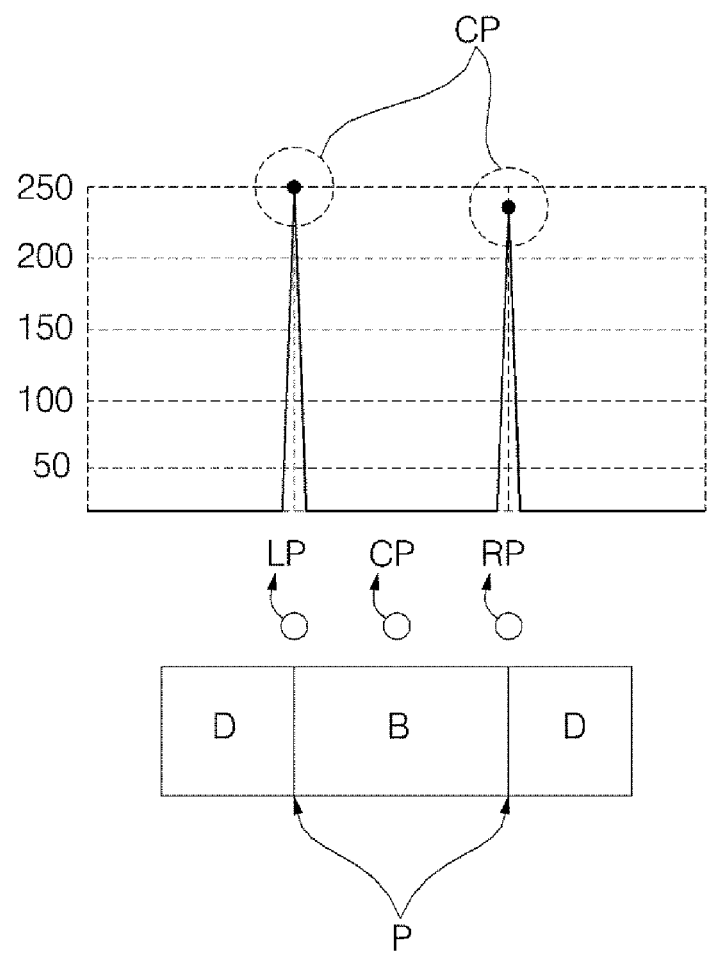
FIG. 2 is an exemplary diagram illustrating the state in which a traffic lane detecting unit calculates a feature point by using a top-hat filter according to the exemplary embodiment illustrated in FIG. 1.

FIG. 2 is an exemplary diagram illustrating the state in which the traffic lane detecting unit 300 calculates the feature point by using the top-hat filter according to the exemplary embodiment illustrated in FIG. 1. The traffic lane detecting unit 300 detects the traffic lane in at least one of the left area and the right area of the vehicle by using the top-hat filter in the top-view image.

The traffic lane detecting unit 300 detects an edge by applying the top-hat filter in a horizontal direction in the gray-scale image of the top-view image and detects the traffic lane center point based on a brightness value of the detected edge. In detail, the traffic lane detecting unit 300 converts the top-view image into the gray-scale image. The traffic lane detecting unit 300 applies the top-hat filter in the horizontal direction in the gray-scale image. The traffic lane detecting unit 300 detects the traffic lane center point CP at which the brightness value is maximum for each edge of a local area in the gray-scale image to which the top-hat filter is applied.

Further, the traffic lane detecting unit 300 may detect the left feature point LP, which is a left boundary of the traffic lane, and the right feature point RP, which is a right boundary of the traffic lane, based on each center point CP. The left feature point LP and the right feature point RP detected by the traffic lane detecting unit 300 are positioned on a boundary P between a dark part D and a bright part B of a road surface. Herein, the bright part B may be a part where the traffic lane is actually drawn, and the dark part D may be a part where the traffic lane is not drawn.

Figure 3:
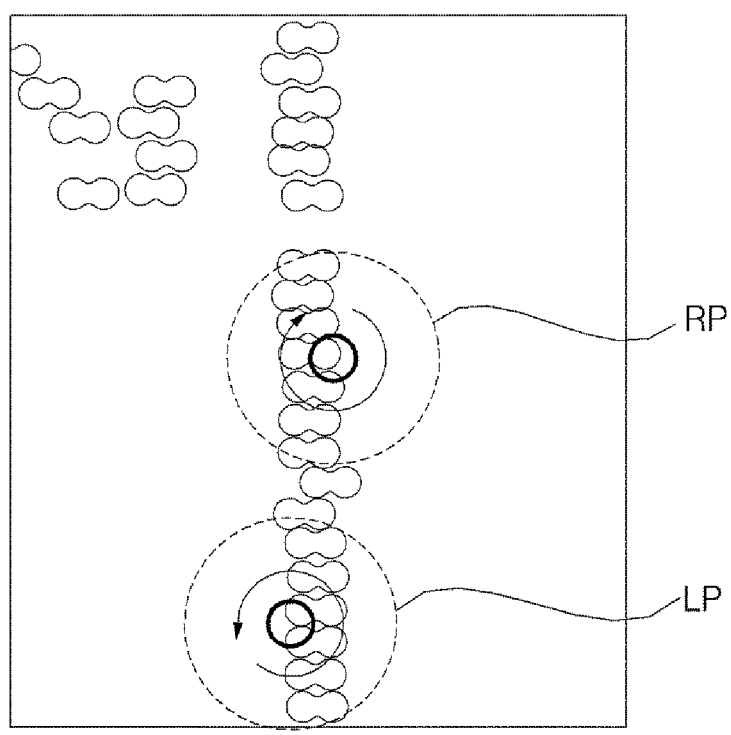
FIG. 3 is an exemplary diagram illustrating the state in which a line component is extracted from the feature point calculated by the traffic lane detecting unit illustrated in FIG. 1.

FIG. 3 is an exemplary diagram illustrating the state in which the line component is extracted from the top-view image based on the feature points detected by the traffic lane detecting unit 300 according to the exemplary embodiment illustrated in FIG. 1. The traffic lane detecting unit 300 makes a search in all radiation directions based on the left feature point LP and the right feature point RP to extract the line component. For example, the traffic lane detecting unit 300 makes a search in 360° based on the left feature point LP and the right feature point RP to extract the line component. Herein, each extracted line component may correspond to a straight line. The traffic lane detecting unit 300 according to the exemplary embodiment may make a search in a clockwise direction based on each right feature point RP and in a counterclockwise direction based on each left feature point LP in FIG. 3. Alternatively, the traffic lane detecting unit 300 may make a search in the counterclockwise direction based on the right feature point RP and in the clockwise direction based on the left feature point LP.

Line fitting is performed based on the searched feature points. Herein, the line fitting may mean approximating two or more straight lines into one straight line. The line components for the left feature point LP and the line components for the right feature point RP may be extracted from the extracted line components by using fitting information.

The traffic lane detecting unit 300 compares angles among the extracted line components to inspect effectiveness among different line components. For example, the traffic lane detecting unit 300 according to the exemplary embodiment may determine that the effectiveness between the line components for the left feature points LP and the line components for the right feature points RP is satisfied when a difference in angle (alternatively, slope) between the line components for the left feature points LP and the line components for the right feature points RP is equal to or less than a predetermined threshold (e.g., 5°).

When the effectiveness between the line components is satisfied, the traffic lane detecting unit 330 detects and stores a traffic lane candidate group based on the center point CP of the traffic lane positioned between the line components.

The traffic lane detecting unit 300 recognizes a left representative traffic lane and a right representative traffic lane based on the vehicle in the traffic lane candidate group. The traffic lane detecting unit 300 determines the two representative traffic lanes as driving traffic lanes of the vehicle. For example, a longest traffic lane may be recognized as the left representative traffic lane in the left traffic lane candidate group based on the vehicle, and a longest right traffic lane may be recognized as the right representative traffic lane in the right traffic lane candidate group based on the vehicle.

Figure 4:
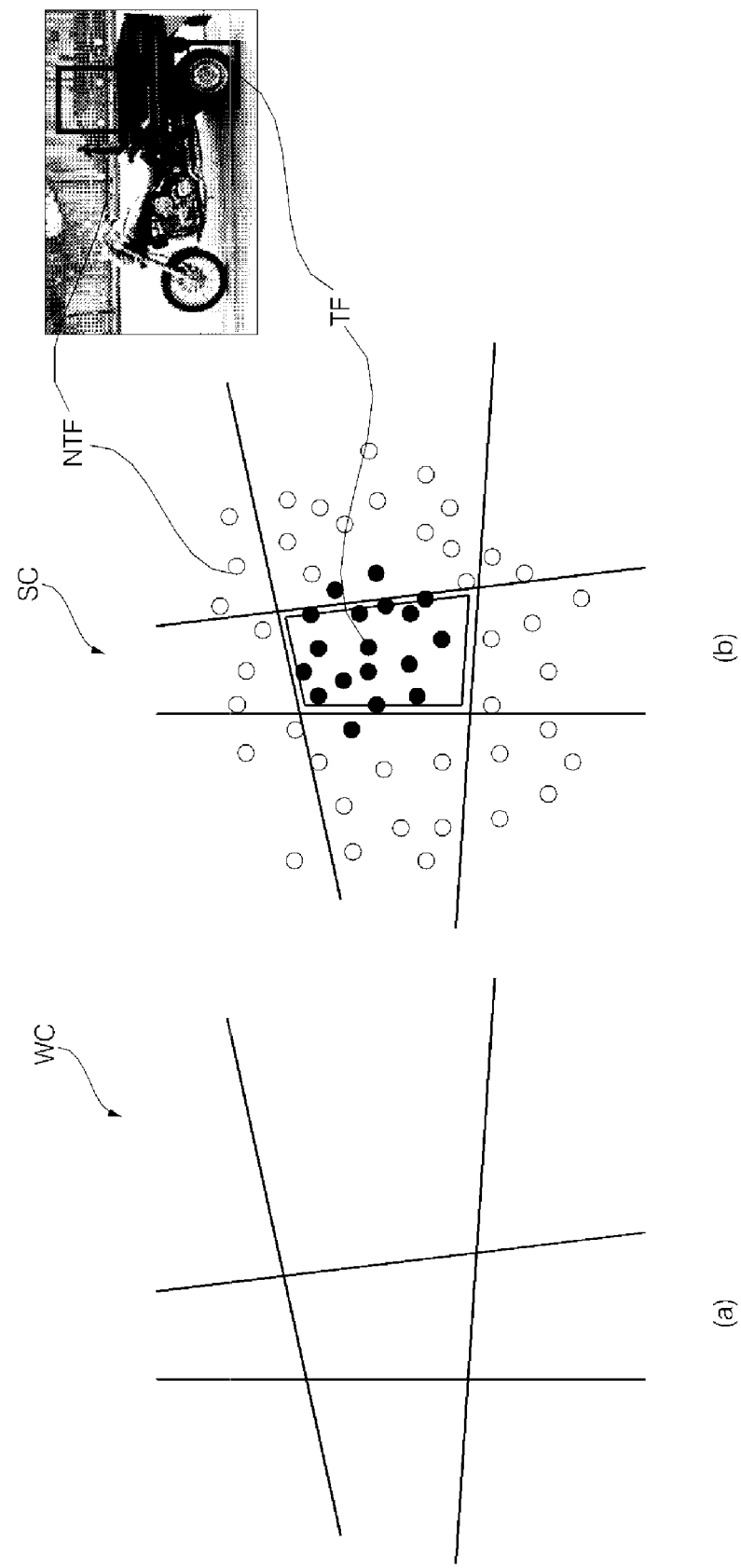
FIG. 4 illustrates that a side vehicle detecting unit detects a wheel shape feature in one side image of the vehicle and illustrates a weak classifier and a strong classifier configured by an Adaboost algorithm.

FIG. 4 illustrates that the side vehicle detecting unit 400 detects a wheel shape feature TF in the left image or the right image of the vehicle, and illustrates a weak classifier (WC) and a strong classifier (SC) configured by an Adaboost algorithm.

The side vehicle detecting unit 400 detects the feature TF corresponding to a predetermined wheel shape in the left image or the right image of the vehicle to recognize a wheel of another vehicle which is present at the left side or the right side of the vehicle.

In detail, the side vehicle detecting unit 400 receives the left image or the right image of the vehicle output by the camera unit 100. Alternatively, the side vehicle detecting unit 400 may receive the top-view image provided to the top-view image output unit 200.

The side vehicle detecting unit 400 detects the feature TF corresponding to the wheel shape in at least one of the left image, the right image, and the top-view image by using at least one of a plurality of predetermined Haar-like features. Hereinafter, it is assumed that the side vehicle detecting unit 400 detects the feature TF corresponding to the wheel shape in the left image or the right image.

The Haar-like features used by the side vehicle detecting unit 400 may include, e.g., an edge feature which is a feature of a contour line, a center-surround feature surrounding the center, and a line feature having the shape of a line. The side vehicle detecting unit 400 stores the detected wheel shape feature TF. The wheel shape feature TF, which the side vehicle detecting unit 400 intends to detect, may be a circle having a predetermined size.

The edge feature may correspond to the shape of a whole wheel in an image of a body of the vehicle. The center-surround feature may correspond to the shapes of a frame and a tire surrounding the wheel of the whole wheel. The line feature may correspond to the shapes of a suspension system connecting the wheel and the body, an empty space of the wheel, and the like.

Countless numbers of forms of the Haar-like features may be present, and the respective forms may be used as classifiers for classifying the part corresponding to the wheel of another vehicle from the other parts from the left image or the right image. However, in general, it is impossible to classify objects only using one Haar-like feature. In order to solve the problem, the Adaboost algorithm may be used in the exemplary embodiment. The Adaboost algorithm may select at least one suitable to detect the wheel among the plurality of Haar-like features. In this case, the respective selected Haar-like features may be used as the weak classifier.

The side vehicle detecting unit 400 configures and stores the weak classifier (WC) by using the Adaboost algorithm. FIG. 4A illustrates a combination of four weak classifiers (WC) used by the side vehicle detecting unit 400. In FIG. 4A, the respective weak classifiers are represented by the lines.

FIG. 4B illustrates that the side vehicle detecting unit 400 detects the wheel shape feature TF of another vehicle in the left image or the right image by using the strong classifier (SC). The strong classifier (SC) may be constituted by the combination of four weak classifiers (WC).

For example, the respective weak classifiers may be classifiers learned through a test image in a prior training step.

In the case of the strong classifier, two or more weak classifiers are combined to form one strong classifier. For example, the side vehicle detecting unit 400 may detect as the wheel only an area classified by the wheel shape feature TF by all of two or more weak classifiers in the left image or the right image.

The Adaboost algorithm may check information of the wheel which is input in real time through the existing learned information.

The side vehicle detecting unit 400 configures the strong classifier (SC) by using the Adaboost algorithm, and thereafter, detects the wheel shape feature TF through the strong classifier (SC) in the left image or the right image.

When the side vehicle detecting unit 400 detects the wheel shape feature TF in the left image or the right image while the vehicle is driven, the side vehicle detecting unit 400 recognizes the wheel. When the Adaboost algorithm constituted by the plurality of Haar-like features completes the learning process for a test image, the side vehicle detecting unit 400 detects the wheel shape feature TF from all images (e.g., the left image and the right image) provided from the camera unit 100, and recognizes the detected wheel shape feature TF as the wheel of another vehicle which is present at the left side or the right side of the vehicle.

When the side vehicle detecting unit 400 detects the wheel shape feature TF under a tunnel entrance situation, the side vehicle detecting unit 400 calculates an average brightness value of the area corresponding to the wheel shape feature TF. When the side vehicle detecting unit 400 detects the wheel shape feature TF, the side vehicle detecting unit 400 calculates an average brightness value of a non-wheel shape feature (NTF). When a value acquired by subtracting the average brightness value of the non-wheel shape feature (NTF) from the average brightness value of the wheel shape feature TF is more than a predetermined threshold, the side vehicle detecting unit 400 recognizes the detected wheel shape feature TF as the wheel of the vehicle which is present at one side of the vehicle.

Figure 5:
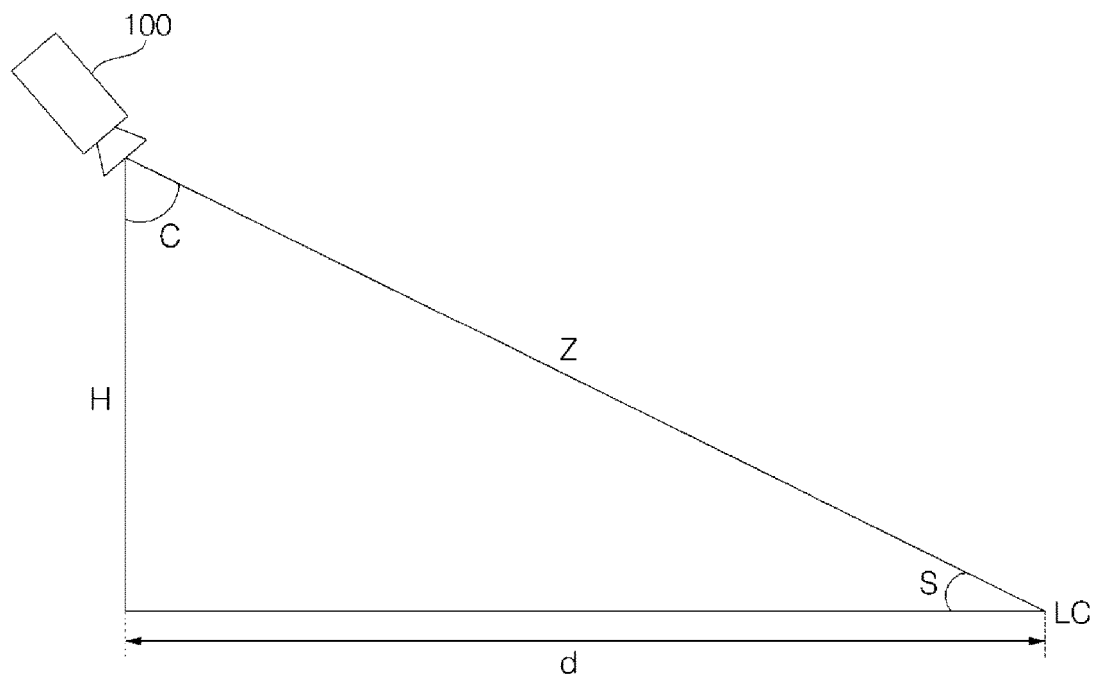
FIG. 5 illustrates a virtual triangle for an another vehicle area estimating unit to acquire a distance between the vehicle and a vehicle at one side.

FIG. 5 illustrates a virtual triangle for the another vehicle area estimating unit 500 to acquire a distance between the vehicle and another vehicle LC. The another vehicle area estimating unit 500 estimates an existing area of another vehicle by considering the wheel shape feature TF of another vehicle, which is detected.

In detail, it is assumed that the camera unit 100 is installed at a height H from the ground. Of course, the height H at which the camera unit 100 is installed may vary according to the vehicle. The height H at which the camera unit 100 is installed is a predetermined value. A camera angle C, which is an angle between the camera unit 100 and the center of a part below another vehicle LC at one side, may vary according to a relative location of another vehicle with respect to the vehicle. A vertical field of view (VFOV) of the camera unit 100 may vary depending on the performance of the camera, and is a predetermined value depending on setting.

The another vehicle area estimating unit 500 calculates a coordinate of the wheel shape feature TF by using a camera parameter of the camera unit 100. The another vehicle area estimating unit 500 may calculate an angle S formed by a line constituted by a part below another vehicle LC including the center of the part below another vehicle LC and the camera unit 100 and a part below the wheel shape feature TF by using a radiation angle C of the camera unit 100 and the vertical field of view (VFOV) of the camera unit 100. Another vehicle area estimating unit 500 may calculate a distance d between the vehicle and another vehicle LC. The another vehicle area estimating unit 500 may calculate a distance Z between the camera unit 100 and a part below a quadrangle including a detected number plate by (Equation 1).

$$\sin(S) = \frac{H}{Z} \quad \text{(Equation 1)}$$

The another vehicle area estimating unit 500 calculates a coordinate of point P(x, y) in the image at one side of the vehicle. The point P(x, y) calculated by the another vehicle area estimating unit 500 is a coordinate of the center of a part of the quadrangle including another vehicle LC, which contacts the ground. The another vehicle area estimating unit 500 sets an X'Y' coordinate system on a plane parallel to an XY plane in a coordinate system of the image photographed by the camera unit 100. The another vehicle area estimating unit 500 calculates a coordinate of the wheel shape feature TF by calculating the coordinate.

Meanwhile, the another vehicle area estimating unit 500 may determine the location of another vehicle based on the top-view image. In detail, the another vehicle area estimating unit 500 may set the center coordinate of the top-view image as the location of the vehicle, calculate the coordinate of the wheel shape feature TF shown in the top-view image, and then determine the relative location of another vehicle with respect to the vehicle based on a difference between the calculated coordinate of the wheel shape feature TF and the center coordinate. Further, the another vehicle area estimating unit 500 may estimate an area having a predetermined shape and a predetermined size as the existing area of another vehicle based on the location of another vehicle.

Figure 6:
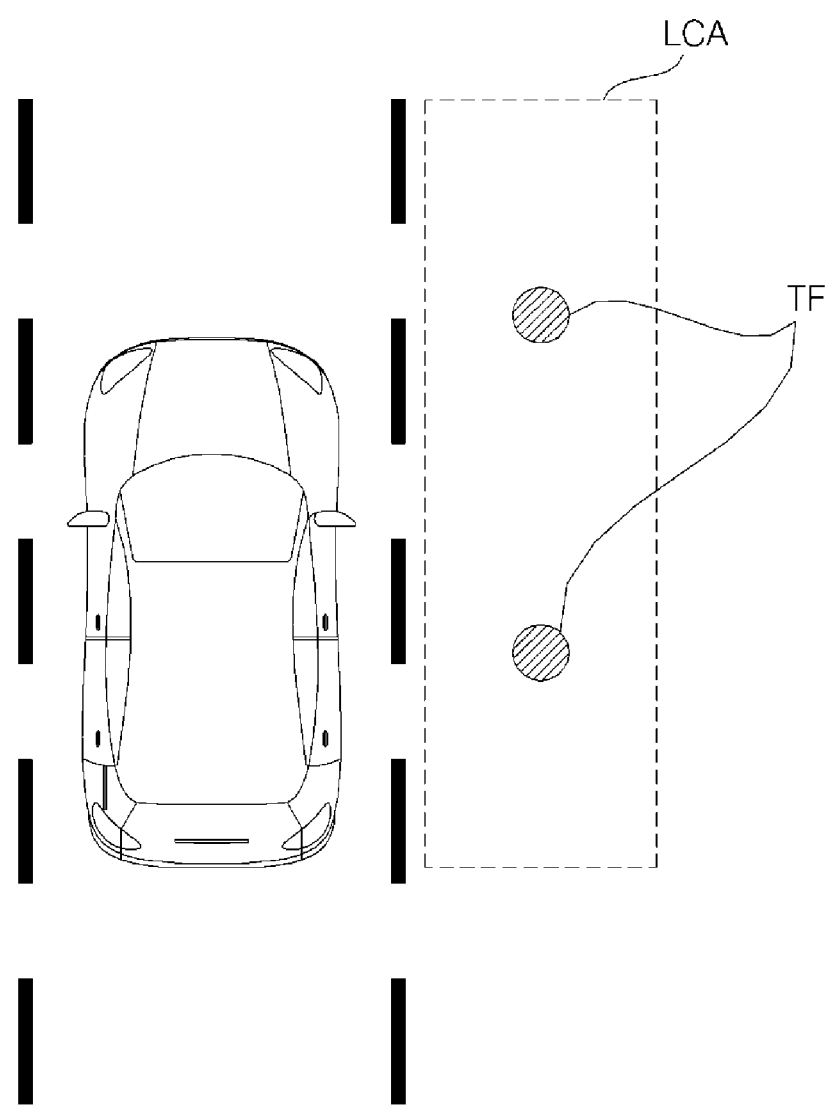
FIG. 6 is a top-view image diagram illustrating a state in which the another vehicle area estimating unit estimates an existing area of another vehicle.

FIG. 6 is a top-view image diagram illustrating a state in which the another vehicle area estimating unit estimates an existing area (LCA) of another vehicle. The another vehicle area estimating unit 500 calculates a coordinate of the wheel shape feature TF in a top-view image. The another vehicle area estimating unit 500 estimates as another vehicle area (LCA) a rectangular area including the wheel shape feature TF calculated in the top-view image. For example, as illustrated in FIG. 6, the another vehicle area estimating unit 500 may estimate as the existing area (LCA) of another vehicle a rectangular area having a horizontal length and a vertical length, which surrounds two wheel shape features TF.

Meanwhile, FIG. 6 illustrates that one existing area (LCA) for two wheel shape features TF is estimated, but the present invention is not limited thereto. For example, when a distance between two wheel shape features TF is more than a reference distance, the another vehicle area estimating unit 500 may estimate different existing areas for each wheel shape feature TF. That is, another vehicle corresponding to any one wheel shape feature TF and another vehicle corresponding to the other one wheel shape feature TF may be processed to be different from each other.

In general, since a distance between the wheels increases as the size of the vehicle becomes larger, the another vehicle area estimating unit 500 according to the exemplary embodiment may set the horizontal length and the vertical length of the rectangle by calculating the length between the detected two wheel shape features TF. The another vehicle area estimating unit 500 may accurately estimate the another vehicle area (LCA) by considering a distance value between different wheel shape features TF.

The warning signal output unit 600 outputs to the warning unit 700 a warning signal corresponding to a driving situation of the vehicle. For example, i) when the vehicle deviates from the driving traffic lane detected by the traffic lane detecting unit 300, and as a result, a part of the vehicle is positioned on a previously detected left traffic lane or right traffic lane, ii) when a distance between the vehicle and the another vehicle existing area (LCA) is less than a predetermined distance, iii) when the vehicle enters the another vehicle existing area (LCA), and the like, the warning signal output unit 600 outputs the warning signal to the warning unit 700. The warning signal output unit 600 outputs the warning signal to the warning unit 700 when the vehicle enters the rectangle in the top-view image.

The warning unit 700 announces danger to a driver based on the warning signal. The warning unit 700 may include at least one of a sound output module, an image output module, and a haptic module. For example, the warning unit 700 may output an acoustic, visual, or tactual feed-back corresponding to the warning signal. The warning unit 700 may output a warning message in the top-view image to announce the danger to the driver.

Preferred exemplary embodiments of the present invention have been illustrated and described above, but the present invention is not limited to the above-described specific embodiments, it is obvious that various modifications may be made by those skilled in the art, to which the present invention pertains without departing from the gist of the present invention, which is claimed in the claims, and such modified embodiments should not be individually understood from the technical spirit or prospect of the present invention.

What is claimed is:

1. An apparatus for safety-driving of a vehicle, the apparatus comprising:
    a plurality of cameras mounted on the vehicle, photographing a vicinity of the vehicle in different directions, and outputting a plurality of images of the vicinity of the vehicle in the different directions, the plurality of images including a left image and a right image of the vehicle;
    at least one processor configured to:
        synthesize the plurality of images to output a top-view image;
        detect a left or right traffic lane of the vehicle from the top-view image based on a traffic lane feature of the top-view image;
        detect a wheel of another vehicle from at least one of the left image and the right image by using at least one of a plurality of Haar-like features detected in the at least one of the left image and the right image;
        estimate an existing area of another vehicle based on a location of the detected wheel of another vehicle; and
        output a warning signal when the vehicle enters the existing area of another vehicle; and
    a warning unit configured to announce a danger to a driver of the vehicle when receiving the warning signal.

2. The apparatus for safety-driving of a vehicle of claim 1, wherein the at least one processor is configured to detect a plurality of traffic lane center points having a predetermined brightness value or more by applying a top-hat filter for each predetermined area in a predetermined direction with respect to a gray-scale image of the top-view image.

3. The apparatus for safety-driving of a vehicle of claim 2, wherein the at least one processor is configured to detect left and right feature points based on the respective traffic lane center points, and
    the left feature point and the right feature point correspond to boundaries of predetermined traffic lane brightness patterns.

4. The apparatus for safety-driving of a vehicle of claim 3, wherein the at least one processor is configured to make a search in all directions from the left feature point and the right feature point to extract a line component for the left feature point and a line component for the right feature point, and detect a left or right traffic lane of the vehicle based on the traffic lane center point when a difference in angle between the line component for the left feature point and the line component for the right feature point is a threshold or less.

5. The apparatus for safety-driving of a vehicle of claim 1, wherein the at least one processor is configured to select the at least one of the plurality of Haar-like features by using an Adaboost algorithm and detect the wheel of another vehicle by using the selected Haar-like feature.

6. The apparatus for safety-driving of a vehicle of claim 5, wherein the at least one processor is configured to combine two or more Haar-like features to detect the wheel of another vehicle when two or more Haar-like features are selected.

7. The apparatus for safety-driving of a vehicle of claim 1, wherein the at least one processor is configured to estimate an area having a predetermined shape and a predetermined size as the existing area of another vehicle based on the location of the detected wheel of another vehicle.

8. The apparatus for safety-driving of a vehicle of claim 7, wherein the at least one processor is configured to output the warning signal when a distance between the vehicle and the existing area of another vehicle is less than a predetermined distance.

* * * * *